(12) United States Patent
Lee

(10) Patent No.: US 10,430,278 B2
(45) Date of Patent: Oct. 1, 2019

(54) RAID SYSTEM INCLUDING NONVOLATILE MEMORY AND OPERATING METHOD OF THE SAME

(71) Applicant: SAMSUNG ELECTRONICS CO., LTD., Suwon-si, Gyeonggi-Do (KR)

(72) Inventor: Ju Pyung Lee, Incheon (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 222 days.

(21) Appl. No.: 15/673,942

(22) Filed: Aug. 10, 2017

(65) Prior Publication Data

US 2018/0150354 A1  May 31, 2018

(30) Foreign Application Priority Data

Nov. 25, 2016 (KR) .................. 10-2016-0158487

(51) Int. Cl.
*G06F 11/00* (2006.01)
*G06F 11/10* (2006.01)
*G06F 3/06* (2006.01)

(52) U.S. Cl.
CPC ........ *G06F 11/1092* (2013.01); *G06F 3/0619* (2013.01); *G06F 3/0665* (2013.01); *G06F 3/0688* (2013.01); *G06F 3/0689* (2013.01); *G06F 11/108* (2013.01)

(58) Field of Classification Search
CPC ............. G06F 11/1088; G06F 11/1084; G06F 11/1092
USPC ................................................ 714/6.24, 6.2
See application file for complete search history.

(56) References Cited

U.S. PATENT DOCUMENTS

| | | |
|---|---|---|
| 6,154,853 A | 11/2000 | Kedem |
| 8,356,292 B2 | 1/2013 | Hung |
| 9,037,795 B1 | 5/2015 | Linnell et al. |
| 9,218,244 B1 | 12/2015 | Hayes et al. |
| 9,244,784 B2 | 1/2016 | Bartlett et al. |
| 9,256,381 B1 | 2/2016 | Fultz et al. |
| 2010/0122148 A1* | 5/2010 | Flynn ............... G06F 11/108 714/773 |
| 2013/0339784 A1* | 12/2013 | Bickelman .......... G06F 11/1092 714/6.11 |
| 2014/0223223 A1 | 8/2014 | Akutsu |
| 2015/0331746 A1 | 11/2015 | O'Connor |

(Continued)

*Primary Examiner* — Sarai E Butler
(74) *Attorney, Agent, or Firm* — F. Chau & Associates, LLC

(57) ABSTRACT

A redundant array of inexpensive disks (RAID) system including nonvolatile memory and an operating method of the same is provided. A nonvolatile memory device implemented as a RAID and including a plurality of first memory chips, which store data chunks, and a second memory chip, in which spare memory regions are defined. A RAID controller controls RAID operations and a rebuild operation of the nonvolatile memory device. The RAID controller monitors a failure probability of each of the first memory chips, and in response to detecting a failure probability of two or more first memory chips that satisfies a predefined threshold value, a first rebuild on data stored in each of the first memory chips is performed to store the data in the second memory chip. A second rebuild on data stored in the first memory chip having the failure using data stored in the second memory chip.

21 Claims, 14 Drawing Sheets

(56) References Cited

U.S. PATENT DOCUMENTS

2016/0253240 A1\* 9/2016 Cocagne ............... G06F 3/0619
714/764

\* cited by examiner

FIG. 3A

| CHIP1 | CHIP2 | CHIP3 | CHIP4 | CHIP5 | CHIP6 | CHIP7 | CHIP8 | CHIP9 |
|---|---|---|---|---|---|---|---|---|
| 0.02 | 0.01 | 0.03 | 0.05 | 0.07 | 0.11 | 0.02 | 0.01 | 0.01 |
| D1 | D2 | D3 | D4 | D5 | D6 | D7 | P1-7 | S |
| D8 | D9 | D10 | D11 | D12 | D13 | P8-14 | D14 | S |
| D15 | D16 | D17 | D18 | D19 | P15-21 | D20 | D21 | S |
| D22 | D23 | D24 | D25 | P22-28 | D26 | D27 | D28 | S |
| D29 | D30 | D31 | P29-35 | D32 | D33 | D34 | D35 | S |
| D36 | D37 | P36-42 | D38 | D39 | D40 | D41 | D42 | S |
| D43 | P43-49 | D44 | D45 | D46 | D47 | D48 | D49 | S |
| P50-56 | D50 | D51 | D52 | D53 | D54 | D55 | D56 | S |

Columns labeled: Failure Probability (CHIP2), DATA CHUNK (CHIP5), PARITY (CHIP8)

Threshold=0.1

FIG. 5A

|  |  |  | 21 |  | 20 |  |  | 22 |
|---|---|---|---|---|---|---|---|---|
| CHIP1 | CHIP2 | CHIP3 | CHIP4 | CHIP5 | CHIP6 | CHIP7 | CHIP8 | CHIP9 |
| 0.02 | 0.01 | 0.03 | 0.12 | 0.07 | 0.11 | 0.02 | 0.01 | 0.01 |
| D1 | D2 | D3 | D4 | D5 | D6 | D7 | P1-7 | P4,6 |
| D8 | D9 | D10 | D11 | D12 | D13 | P8-14 | D14 | P11,13 |
| D15 | D16 | D17 | D18 | D19 | P15-21 | D20 | D21 | D18 |
| D22 | D23 | D24 | D25 | P22-28 | D26 | D27 | D28 | P25,26 |
| D29 | D30 | D31 | P29-35 | D32 | D33 | D34 | D35 | D33 |
| D36 | D37 | P36-42 | D38 | D39 | D40 | D41 | D42 | P38,40 |
| D43 | P43-49 | D44 | D45 | D46 | D47 | D48 | D49 | P45,47 |
| P50-56 | D50 | D51 | D52 | D53 | D54 | D55 | D56 | P52,54 |

CREATE PARITY OF CHIP4&6
AND STORE IN CHIP9

FIG. 5B

| CHIP1 | CHIP2 | CHIP3 | CHIP4 | CHIP5 | CHIP6 | CHIP7 | CHIP8 | CHIP9 |
|---|---|---|---|---|---|---|---|---|
| 0.02 | 0.01 | 0.03 | 0.12 | 0.07 | 0.11 | 0.02 | 0.01 | 0.01 |
| D1 | D2 | D3 | D4 | D5 | D6 | D7 | P1-7 | D6 |
| D8 | D9 | D10 | D11 | D12 | D13 | P8-14 | D14 | D13 |
| D15 | D16 | D17 | D18 | D19 | P15-21 | D20 | D21 | P15-21 |
| D22 | D23 | D24 | D25 | P22-28 | D26 | D27 | D28 | D26 |
| D29 | D30 | D31 | P29-35 | D32 | D33 | D34 | D35 | D33 |
| D36 | D37 | P36-42 | D38 | D39 | D40 | D41 | D42 | D40 |
| D43 | P43-49 | D44 | D45 | D46 | D47 | D48 | D49 | D47 |
| P50-56 | D50 | D51 | D52 | D53 | D54 | D55 | D56 | D54 |

FIG. 6A

| CHIP1 | CHIP2 | CHIP3 | CHIP4 | CHIP5 | CHIP6 | CHIP7 | CHIP8 | CHIP9 |
|---|---|---|---|---|---|---|---|---|
| 0.02 | 0.01 | 0.14 | 0.12 | 0.07 | 0.11 | 0.02 | 0.01 | 0.01 |
| D1 | D2 | D3 | D4 | D5 | D6 | D7 | P1-7 | P3,4,6 |
| D8 | D9 | D10 | D11 | D12 | D13 | P8-14 | D14 | P10,11,13 |
| D15 | D16 | D17 | D18 | D19 | P15-21 | D20 | D21 | P17,18 |
| D22 | D23 | D24 | D25 | P22-28 | D26 | D27 | D28 | P24,25,26 |
| D29 | D30 | D31 | P29-35 | D32 | D33 | D34 | D35 | P31,33 |
| D36 | D37 | P36-42 | D38 | D39 | D40 | D41 | D42 | P38,40 |
| D43 | P43-49 | D44 | D45 | D46 | D47 | D48 | D49 | P44,45,47 |
| P50-56 | D50 | D51 | D52 | D53 | D54 | D55 | D56 | P51,52,54 |

Labels: 32 (above CHIP3), 31 (above CHIP5), 30 (above CHIP7), 33 (above CHIP9)

FIG. 6B

| | | | 31 | | 30 | | | 34 |
|---|---|---|---|---|---|---|---|---|
| CHIP1 | CHIP2 | CHIP3 | CHIP4 | CHIP5 | CHIP6 | CHIP7 | CHIP8 | CHIP9 |
| 0.02 | 0.01 | 0.14 | 0.12 | 0.07 | 0.11 | 0.02 | 0.01 | 0.01 |
| D1 | D2 | D3 | D4 | D5 | D6 | D7 | P1-7 | D3 |
| D8 | D9 | D10 | D11 | D12 | D13 | P8-14 | D14 | D10 |
| D15 | D16 | D17 | D18 | D19 | P15-21 | D20 | D21 | D17 |
| D22 | D23 | D24 | D25 | P22-28 | D26 | D27 | D28 | D24 |
| D29 | D30 | D31 | P29-35 | D32 | D33 | D34 | D35 | D31 |
| D36 | D37 | P36-42 | D38 | D39 | D40 | D41 | D42 | P36-42 |
| D43 | P43-49 | D44 | D45 | D46 | D47 | D48 | D49 | D44 |
| P50-56 | D50 | D51 | D52 | D53 | D54 | D55 | D56 | D51 |

FIG. 7A

| | CHIP1 | CHIP2 | 42<br>CHIP3 | 41<br>CHIP4 | CHIP5 | 40<br>CHIP6 | CHIP7 | CHIP8 | ... | 43<br>CHIP15 | CHIP16 | 44<br>CHIP17 |
|---|---|---|---|---|---|---|---|---|---|---|---|---|
| | 0.02 | 0.01 | 0.14 | 0.12 | 0.07 | 0.11 | 0.02 | 0.01 | | 0.09 | 0.01 | 0.01 |
| | D1 | D2 | D3 | D4 | D5 | D6 | D7 | D8 | | D15 | P1-15 | P3,4,6,15 |
| | D16 | D17 | D18 | D19 | D20 | D21 | D22 | D23 | ... | P16-30 | D30 | P18,19,21 |
| | D31 | D32 | D33 | D34 | D35 | D36 | D37 | D38 | | D44 | D45 | P33,34,36,44 |
| | D46 | D47 | D48 | D49 | D50 | D51 | D52 | D53 | | D59 | D60 | P48,49,51,59 |
| | ⋮ | | | | | ⋮ | | | | ⋮ | | |
| | P226-P240 | D226 | D227 | D228 | D229 | D230 | D231 | P232 | ... | D239 | D240 | P227,228,230,239 |

FIG. 7B

| CHIP1 | CHIP2 | CHIP3 | CHIP4 | CHIP5 | CHIP6 | CHIP7 | CHIP8 | ... | CHIP15 | CHIP16 | CHIP17 |
|---|---|---|---|---|---|---|---|---|---|---|---|
| 0.02 | 0.01 | 0.14 | 0.12 | 0.07 | 0.11 | 0.02 | 0.01 | | 0.09 | 0.01 | 0.01 |
| D1 | D2 | D3 | D4 | D5 | D6 | D7 | D8 | | D15 | P1-15 | D3 |
| D16 | D17 | D18 | D19 | D20 | D21 | D22 | D23 | ... | P16-30 | D30 | D18 |
| D31 | D32 | D33 | D34 | D35 | D36 | D37 | D38 | | D44 | D45 | D33 |
| D46 | D47 | D48 | D49 | D50 | D51 | D52 | D53 | | D59 | D60 | D48 |
| ⋮ | | | | | | | | | ⋮ | | |
| P226-P240 | D226 | D227 | D228 | D229 | D230 | D231 | P232 | ... | D239 | D240 | D227 |

RAID SYSTEM INCLUDING NONVOLATILE MEMORY AND OPERATING METHOD OF THE SAME

CROSS-REFERENCE TO RELATED APPLICATION

This application claims priority under 35 U.S.C. § 119 from Korean Patent Application No. 10-2016-0158487, filed on Nov. 25, 2016 in the Korean Intellectual Property Office, the disclosure of which is incorporated by reference herein.

1. TECHNICAL FIELD

The present disclosure relates to a redundant array of inexpensive disks (RAID) system, and more particularly, to a RAID system including a nonvolatile memory.

2. DISCUSSION OF THE RELATED ART

A redundant array of inexpensive disks (RAID) (also commonly referred to as a redundant array of independent disks), which is a method commonly used in a storage medium such as a server having important data, stores parities in one storage medium from among other various storage media and can thus restore data stored in another storage medium to normal data upon the occurrence of error in the corresponding data. The RAID can balance input/output (I/O) operations and can impact the overall performance of servers.

In a system for ensuring the integrity of data, a RAID level 5 or RAID level 6 system is used in which parity bits are distributed and stored. RAID level 5 is a method in which one parity bit is distributed and stored per data chunk, and RAID level 6 is a method in which two parity bits are distributed and stored per data chunk. When the RAID level 5 or RAID level 6 system is used, one or two spare storage regions are provided, and a rebuild operation may be performed in the spare storage regions upon the occurrence of a failure.

A RAID rebuild operation is a process of creating lost data by accessing parity bits and data included in an entire RAID system, in the event that a disk fails without prior warning. This type of RAID rebuild operation not only generally takes a long time, but also considerably affects the I/O performance of an entire RAID system during the rebuild operation.

Therefore, a rebuild process capable of ensuring the performance of an entire RAID system and at the same, quickly restoring data by performing tasks necessary for a rebuild in advance during a typical I/O operation, before performing a rebuild operation upon the occurrence of a failure in a memory device or a solid-state drive (SSD) included in the RAID system.

SUMMARY

Exemplary embodiments of the present inventive concept provide a redundant array of inexpensive disks (RAID) system, which is capable of reducing the amount of time and input/output (I/O) utilized to perform a rebuild upon the occurrence of a failure by performing tasks necessary for the rebuild in advance according to the failure probability of a nonvolatile memory device or a solid-state drive (SSD) included in the RAID system.

However, exemplary embodiments of the inventive concept are not restricted to those set forth herein. The above and other exemplary embodiments of the inventive concept will become more apparent to a person of ordinary skill in the art to which the present disclosure pertains by referencing the detailed description of the present disclosure given below.

According to embodiment of the inventive concept, a nonvolatile memory device configured as a RAID, the nonvolatile memory including a plurality of first memory chips, which store data chunks, and a second memory chip, in which spare memory regions are defined; and a RAID controller that controls a RAID operation and a rebuild operation of the nonvolatile memory device, wherein the RAID controller monitors a failure probability of each of the first memory chips, in response to detection of two or more first memory chips having a failure probability that satisfies a predefined threshold value, the RAID controller performs a first rebuild operation on data stored in each of the two or more first memory chips to store the data in the second memory chip, and in response to detection of a failure occurring in one of the two or more first memory chips, the RAID controller performs a second rebuild operation on data stored in the first memory chip where the failure has occurred using the data stored in the second memory chip.

According to an exemplary embodiment of the inventive concept, a RAID system, includes a plurality of solid state drives (SSDs) coupled to a host, each of the SSDs including a nonvolatile memory device, which is implemented as a RAID and includes a plurality of first memory chips storing data chunks and a second memory chip having spare memory regions, and a RAID controller controlling a RAID operation and a rebuild operation of the nonvolatile memory device, wherein the RAID controller monitors a failure probability of each of the first memory chips, in response to two or more first memory chips whose failure probability satisfies a predefined threshold value being detected, the RAID controller performs a first rebuild operation on data stored in each of the two or more first memory chips to store the data in the second memory chip, and in response to a failure occurring in one of the two or more first memory chips, the RAID controller performs a second rebuild operation on data stored in the first memory chip where the failure has occurred using the data stored in the second memory chip.

A method of operating a redundant array of inexpensive disks (RAID) system, the RAID system including a RAID controller, the method includes providing a nonvolatile memory device configured as a RAID, in which the nonvolatile memory includes a plurality of first memory chips that store data chunks, and a second memory chip in which spare memory regions are defined; and controlling, by the RAID controller, a RAID operation and one or more rebuild operations of the nonvolatile memory device, and monitoring a failure probability of each of the plurality of first memory chips; performing, by the RAID controller, a first rebuild operation on data stored in each of the two or more first memory chips to store the data in the second memory chip in response to detecting the failure probability of two or more first memory chips satisfying a predefined threshold value; and performing, by the RAID controller, a second rebuild operation on data stored in the first memory chip where a failure has occurred using the data stored in the second memory chip in response to detecting the failure occurring in one of the two or more first memory chips.

In an embodiment of the inventive concept, the first rebuild operation performed by the RAID includes creating a parity corresponding to the data stored in each of the two or more first memory chips to store the parity in the second memory chip.

The creating of the parity comprises XORing the data stored in each of the two or more first memory chips.

The first memory chips may store parities corresponding to the data chunks, and the first rebuild operation may include storing data chunks without parities in each of the two or more memory chips in the second memory chip.

Other teachings of the embodiments of the inventive concept will be appreciated by a person of ordinary skill in the art from the following detailed description, the drawings, and the claims.

BRIEF DESCRIPTION OF THE DRAWINGS

The above and other exemplary embodiments of the inventive concept will become more apparent to a person of ordinary skill in the art by describing in detail exemplary embodiments thereof with reference to the attached drawings, in which:

FIGS. 3A, 3B and 3C are diagrams illustrating an exemplary rebuild operation performed by the RAID system according to the exemplary embodiment of FIG. 1;

FIGS. 5A and 5B are diagrams illustrating another exemplary rebuild operation performed by the RAID system according to the exemplary embodiment of FIG. 1;

FIGS. 6A and 6B are diagrams illustrating another exemplary rebuild operation performed by the RAID system according to the exemplary embodiment of FIG. 1;

FIGS. 7A and 7B are diagrams illustrating another exemplary rebuild operation performed by the RAID system according to the exemplary embodiment of FIG. 1;

DETAILED DESCRIPTION

At least one system of redundant array of inexpensive disks (RAID) according to an embodiment of the inventive concept will hereinafter be described with reference to FIGS. 1 through 9.

Figure 1:
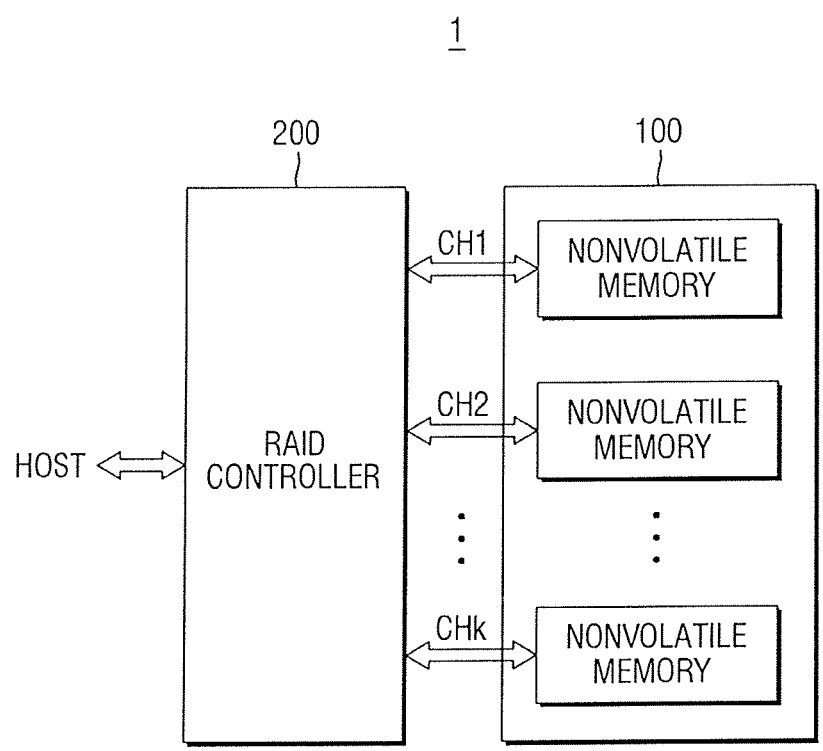
FIG. 1 is a block diagram of a redundant array of inexpensive disks (RAID) system according to an exemplary embodiment of the inventive concept.

FIG. 1 is a block diagram of a RAID system according to an exemplary embodiment of the inventive concept.

Referring to FIG. 1, a RAID system 1 may include a memory system 100 and a RAID controller 200.

The memory system 100 may include, for example, a plurality of nonvolatile memory chips. The nonvolatile memory chips may communicate with the RAID controller 200 via, for example, first through k-th channels CH1 through CHk.

In some embodiments, the nonvolatile memory chips may be, for example, negative-AND (NAND) flash memory chips, but the inventive concept is not limited to NAND flash memory chips.

In other exemplary embodiments, the nonvolatile memory chips may comprise, for example, solid-state drives (SSDs). For example, the memory system 100 may include a plurality of SSDs that are implemented as a RAID.

The RAID controller 200 may be coupled to a host "HOST" and to the memory system 100. The RAID controller 200 may communicate with the host via wired or wireless protocols. In response to the receipt of a request from the host "HOST", the RAID controller 200 may access the memory system 100. For example, the RAID controller 200 may be configured to control read, write, erase, and background operations of the memory system 100.

Although not specifically illustrated, the RAID controller 200 may be configured to provide an interface between the memory system 100 and the host "HOST". Also, the RAID controller 200 may be configured to drive firmware for controlling the memory system 100 so as to perform, for example, read and write operations as instructed by the host.

For example, the RAID controller 200 may further include elements such as a random access memory (RAM), a processing unit, a host interface, and a memory interface that are already known. The RAM may be used as at least one of: an operating memory of the processing unit, a cache memory between the memory system 100 and the host "HOST", and a buffer memory between the memory system 100 and the host "HOST". The processing unit may control the overall operation of the RAID controller 200.

With continued reference to FIG. 1, the RAID controller 200 may perform a RAID rebuild operation on the memory system 100. More specifically, the RAID controller 200 may perform a RAID rebuild operation on the memory system 100 in units of stripes (referred to as stripe units, stripe length, chunk size). A rebuild operation performed on the memory system 100 by the RAID controller 200 will be described later in detail.

The host interface may include a protocol for exchanging data between the host "HOST" and the RAID controller 200. For example, the RAID controller 200 may be configured to communicate with the host "HOST" via an interface protocol such as a Universal Serial Bus (USB) protocol, a MultiMedia Card (MMC) protocol, a Peripheral Component Interconnection (PCI) protocol, a PCI-Express (PCI-E) protocol, an Advanced Technology Attachment (ATA) protocol, a serial-ATA protocol, a parallel-ATA protocol, a Small Computer Small Interface (SCSI) protocol, an Enhanced Small Disk Interface (ESDI) protocol, or an Integrated Drive Electronics (IDE) protocol.

In some exemplary embodiments of the inventive concept, the RAID controller 200 and the memory system 100 may be integrated into a single semiconductor device. For example, the RAID controller 200 and the memory system 100 may be integrated into a single semiconductor device to form a memory card.

In another example, the RAID controller 200 and the memory system 100 may be integrated into a single semiconductor device to form an SSD. In this example, the operating speed of the host "HOST", which is connected to the memory system 100, may be considerably enhanced. However, the inventive concept is not limited to this example. The RAID controller 200 and the memory system 100 may be configured to be physically separate, and thus detachable, from each other.

In other exemplary embodiments of the inventive concept, the RAID controller 200 and the memory system 100 may be integrated into a single semiconductor device to form a memory card. For example, the RAID controller 200 and the memory system 100 may be integrated into a single semiconductor device to form a memory card such as a Personal Computer Memory Card International Association (PCMCIA) card, a CompactFlash (CF) card, a SmartMedia Card (SMC), a memory stick, a MultiMedia Card (MMC), a Reduced-Size (RS) MMC, or a MMCmicro, a Secure Digital (SD) card, a miniSD card, a microSD card, a Secure Digital High Capacity (SDHC), or a Universal Flash Storage (UFS), just to name some non-limiting possible examples.

The memory system 100 may be provided as, for example, an Ultra Mobile PC (UMPC), a workstation, a net-book, a Personal Digital Assistant (PDA), a portable computer, a web tablet, a wireless phone, a mobile phone, a smart phone, an e-book, a Portable Multimedia Player (PMP), a portable game device, a navigation device, a black box, a digital camera, a 3-Dimensional (3D) television, a digital audio recorder, a digital audio player, a digital picture recorder, a digital picture player, a digital video recorder, a digital video player, a device capable of transmitting and receiving data in an wireless environment, one of various electronic devices constituting a home network, one of various electronic devices constituting a computer network, one of various electronic devices constituting a telematics network, a Radio-Frequency IDentification (RFID) device, or one of various elements constituting a computing system.

The memory system 100 may be packaged in various manners. For example, the memory system 100 may be packaged by various methods such as Package on Package (PoP), Ball Grid Arrays (BGAs), Chip Scale Packages (CSPs), Plastic Leaded Chip Carrier (PLCC), Plastic Dual In-Line Package (PDIP), Die in Waffle Package, Die in Wafer Form, Chip On Board (COB), Ceramic Dual In-Line Package (CERDIP), Plastic Metric Quad Flat Package (MQFP), Thin Quad Flat Package (TQFP), Small Outline Integrated Circuit (SOIC), Shrink Small Outline Package (SSOP), Thin Small Outline Package (TSOP), Thin Quad Flat Package (TQFP), System In Package (SIP), Multi Chip Package (MCP), Wafer-level Fabricated Package (WFP), Wafer-Level Processed Stack Package (WSP), etc.

Figure 2:
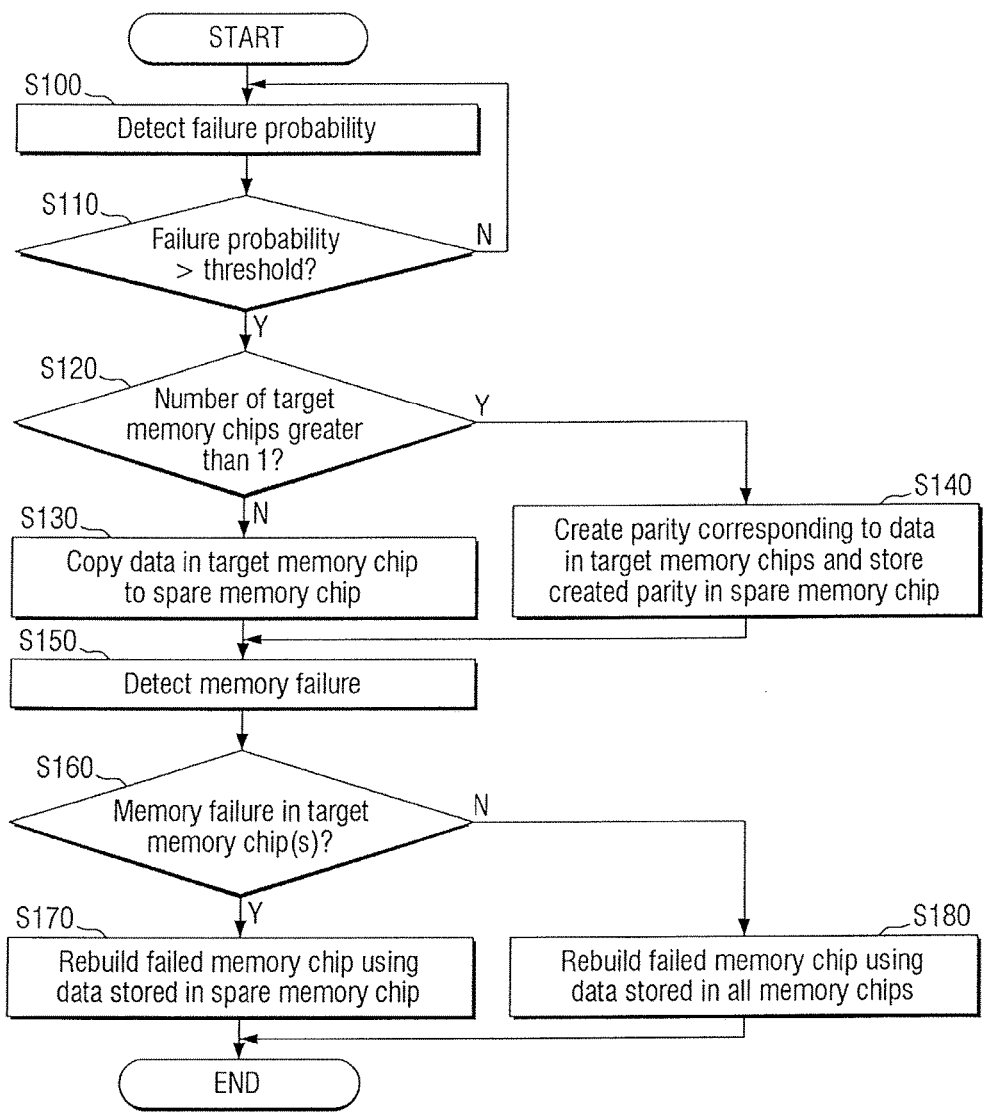
FIG. 2 is a flowchart illustrating a RAID operation of the RAID system according to the exemplary embodiment of FIG. 1.

FIG. 2 is a flowchart illustrating a RAID operation performed by the RAID system 1.

Referring to FIG. 2, at (S100) the RAID system 1 determines the failure probability of each of the nonvolatile memory chips of the memory system 100.

At (S110) the RAID system 1 determines whether the failure probability of each of the nonvolatile memory chips exceeds a predefined threshold value.

At (S120), the RAID system 1 determines the number of memory chips whose failure probability exceeds the predefined value, (e.g., the number of target memory chips (S120)).

If there is only one target memory chip, at (S130) the RAID system 1 copies data stored in the target memory chip to a spare memory chip. However, if there are multiple target memory chips, at (S140) the RAID system 1 creates a parity for data stored in each of the multiple target memory chips and stores the created parity in the spare memory chip.

Thereafter, at (S150) the RAID system 1 detects the occurrence of a failure, and at (S160) determines whether the failure has occurred in the target memory chip(s).

In response to a determination at (S160) that a failure has occurred in the target memory chip(s), at (S170) the RAID system 1 rebuilds data of the target memory chip(s) with the data stored in the spare memory chip. On the other hand, in response to determination at (S160) that a failure has occurred in a nonvolatile memory chip other than the target memory chip(s), then at (S180) the RAID system 1 rebuilds data of the nonvolatile memory chip where the failure has occurred using data chunks and parities stored in all the nonvolatile memory chips.

The rebuild operation of the RAID system 1 will hereinafter be described in further detail with reference to FIGS. 3A, 3B and 3C.

Figure 3B:
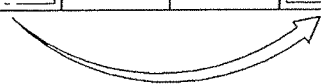
Figure 3C:
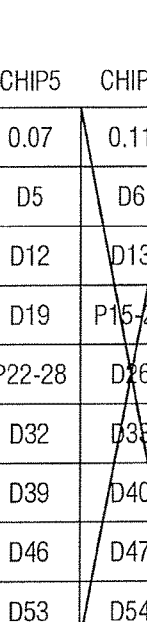

FIGS. 3A, 3B and 3C are diagrams illustrating an exemplary rebuild operation performed by the RAID system according to the exemplary embodiment of FIG. 1.

Referring to FIG. 3A, the memory system 100, which is included in the RAID system 1, may include a plurality of memory chips CHIP1 through CHIP9. More specifically, the memory system 100 may include eight nonvolatile memory chips, i.e., first through eighth memory chips CHIP1 through CHIP8, which store data chunks "DATA CHUNK" and parities "PARITY", and a spare memory chip CHIP9, which is for rebuilding data stored in each of the first through eighth memory chips CHIP1 through CHIP8 upon the occurrence of a failure.

The number of nonvolatile memory chips included in the memory system 100 is not limited in any way based on the 9 memory chips illustrated in FIG. 3A.

For example, the number of nonvolatile memory chips included in the memory system 100 may vary depending on the configuration of the RAID system 1.

In some exemplary embodiments of the inventive concept, more than one spare memory chip may be provided in the memory system 100. For example, in case that a failure occurs in two of the first through eighth memory chips (e.g. two of CHIP1 through CHIP8 fail), the memory system 100 may include two spare memory chips to rebuild data stored in the two memory chips where the failure has occurred.

The first through eighth memory chips CHIP1 through CHIP8 may be configured to data, and also to store P parities and Q parities. Q parities may be of a different type from P parities and may be formed by a different method from P parities.

Each of the first through ninth memory chips CHIP1 through CHIP9 may include stripes (e.g. data stripes), which are defined by rows. For example, a stripe may include seven data chunks "DATA CHUNK" and one parity "PARITY" corresponding to the seven data chunks "DATA CHUNK".

Referring to FIGS. 3A, 3B and 3C, seven data chunks D1 through D7 are stored in the first through seventh memory chips CHIP1 through CHIP7, respectively, and a parity P1-7 corresponding to the seven data chunks D1 through D7 may be created and stored in the eighth memory chip CHIP8. The parity P1-7 may be, for example, a parity obtained by XORing the seven data chunks D1 through D7.

Data chunks D8 through D55 and parities P8-14, P22-28, ..., P43-49, and P50-56 may also be stored in the first through eighth memory chips CHIP1 through CHIP8.

Spare regions S may be allocated to the ninth memory chip CHIP9 in advance before a rebuild operation to be performed by the memory system 100. That is, the spare regions S are supposed to store data when a rebuild operation begins and are thus empty until a rebuild operation begins. The ninth memory chip CHIP9 to which the spare regions S are allocated in advance before a rebuild operation will hereinafter be referred to as the spare memory chip CHIP9.

As described above, the memory system 100 may be integrated into a single semiconductor device. Thus, it is obvious to those skilled in the art that the first through ninth memory chips CHIP1 through CHIP9 may be memory cells integrated into a single semiconductor package.

Referring again to FIG. 2, the RAID system 1 determines the failure probability of each of the nonvolatile memory chips of the memory system 100 (S100). More specifically, the RAID controller 200 calculates the failure probability of each of the first through ninth memory chips CHIP1 through CHIP9 included in the memory system 100 and determines whether the failure probability of each of the first through ninth memory chips CHIP1 through CHIP9 exceeds the predefined threshold value. The calculation of the failure probability of each of the first through ninth memory chips CHIP1 through CHIP9 by the RAID system 1 will hereinafter be described with reference to FIG. 4.

Figure 4:
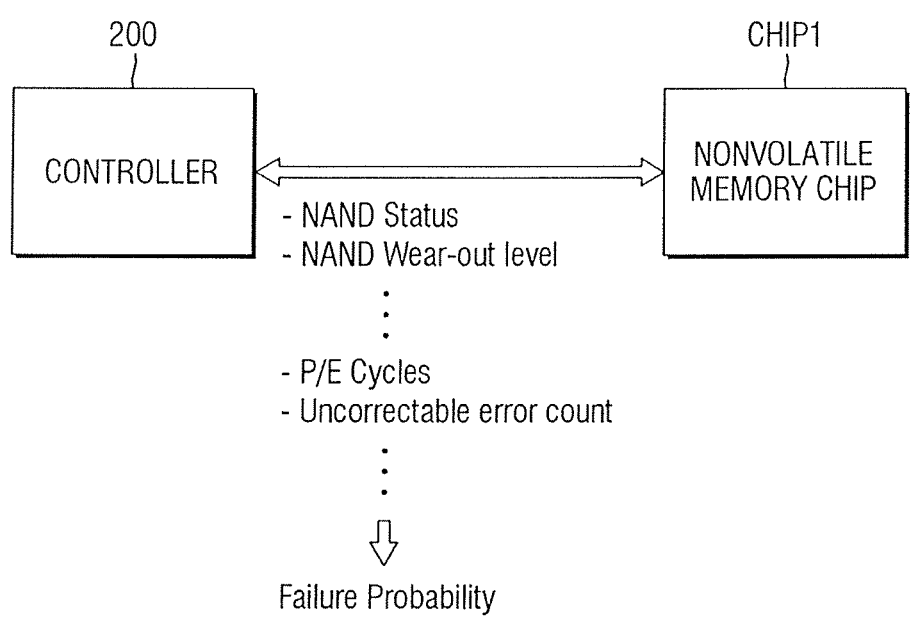
FIG. 4 is a block diagram for explaining parameters necessary for the RAID system according to the exemplary embodiment of FIG. 1 to perform a rebuild operation.

FIG. 4 is a block diagram for explaining parameters necessary for the RAID system according to the exemplary embodiment of FIG. 1 to perform a rebuild operation.

Referring to FIG. 4, a memory chip, for example, the first memory chip CHIP1, may provide parameters regarding the durability or health of a NAND memory cell included therein, such as NAND status information and NAND wear-out level information, to the RAID controller 200. It is this information that is used to determine the failure probability of the various chips. Although it is possible that an unexpected failure may occur, there may be indications that can be used for predictive failure analysis. For example, diagnostics, usage statistics, bit data viability, are some of the items that can be used to calculate a failure probability.

For example, the RAID controller 200 may calculate the failure probability of the first memory chip CHIP1 using status information of the first memory chip CHIP1, provided by the first memory chip CHIP1. In some exemplary embodiments, the RAID controller 200 may calculate the failure probability of the first memory chip CHIP1 using status information of the first memory chip CHIP1, which may be provided by the first memory chip CHIP1, and information required for the RAID controller 200 to control the first memory chip CHIP1 such as program/erase (P/E) cycle information and uncorrectable error count information.

The RAID controller 200 may calculate and store the failure probability of each of the first through ninth memory chips CHIP1 through CHIP9 of the memory system 100. The RAID controller 200 may calculate and store the failure probability of each of the first through ninth memory chips CHIP1 through CHIP9 at intervals of a predetermined period. Alternatively, the RAID controller 200 may calculate and store the failure probability of each of the first through ninth memory chips CHIP1 through CHIP9 whenever data of each of the first through ninth memory chips CHIP1 through CHIP9 is transmitted or whenever an event occurs. A person of ordinary skill in the art should understand and appreciate that the RAID controller may calculate and store failure probability for as many memory chips as are used in a given memory system.

FIG. 3A shows the failure probabilities of the first through ninth memory chips CHIP1 through CHIP9, as calculated by the RAID controller 200, along with the structure of data stored in the first through ninth memory chips CHIP1 through CHIP9. However, the failure probabilities of the first through ninth memory chips CHIP1 through CHIP9, shown in FIG. 3A, are merely exemplary and do not in any way limit the scope of the inventive concept.

The RAID controller 200 may determine and store the predefined threshold value in advance. In response to an existing a memory chip whose failure probability exceeds the predefined threshold value among the first through ninth memory chips CHIP1 through CHIP9, a first rebuild operation may be performed on the memory chip whose failure probability exceeds the predefined threshold value. In the description that follows, it is assumed that the predefined threshold value for failure probability is set to, for example, 0.1.

In some exemplary embodiments of the inventive concept, a first rebuild refers to an operation of storing data of the first through eighth memory chips CHIP1 through CHIP8 in advance. Typically the advance storage will occur in a designated spare memory chip, such as CHIP9, where the spare regions S are allocated, so as to prepare for a failure of any one of the first through eighth memory chips CHIP1 through CHIP8.

As shown in FIG. 3A, since the sixth memory chip CHIP6 has a failure probability of 0.11, which is greater than the predefined threshold value of 0.01, the sixth memory chip CHIP6 is determined as a target memory chip on which to perform a first rebuild. In viewing the failure probability shown in FIG. 3A, while there are other memory chips that also exceed the predefined threshold value of 0.01, in this example CHIP6 has the highest probability of failure. However, the inventive concept is not limited to the aforementioned.

Thereafter, the number of memory chips that have a failure probability greater than the predefined threshold value and are thus to be subject to a first rebuild, i.e., a number N of target memory chips, is determined (FIG. 2 at S120).

With reference to FIG. 2 at (S130), in a case in which the number N of target memory chips is 1, (e.g., N=1), data stored in the target memory chip is copied to a spare memory chip. S130 will hereinafter be described with reference to FIG. 3B.

Referring to FIG. 3B, data 10 stored in the sixth memory chip CHIP6, which is a target memory chip on which to perform a first rebuild (e.g. CHIP6 having a failure probability of 0.11), is copied and provided to the spare memory chip CHIP9 where the spare regions S (shown in FIG. 3A) are allocated, and the spare memory chip CHIP9 stores the data 10 in the spare regions S as data 11. In this manner, the first rebuild of the sixth memory chip CHIP6 may be completed. If CHIP6 is used after the first rebuild, as this memory chip may not have failed, but is more likely to fail than according to a predefined threshold, there can be a subsequent data copy similar to the copy shown in FIG. 3B. The reason to update any data that has been modified, or to recopy the memory chip in full would be to ensure that the spare memory CHIP9 has the latest information in case a second rebuild is performed.

Once the first rebuild of the sixth memory chip CHIP6 is completed, the RAID controller 200 detects a failure in any one of the first through eighth memory chips CHIP1 through CHIP8 (S150 and S160). In response to a failure being detected from the target memory chip, for example, the sixth memory chip CHIP6, a second rebuild is performed (S170) to restore the data 10 of the sixth memory chip CHIP6 with the data 11 stored in the spare memory chip CHIP9 at (S130).

In a case in which a first rebuild is performed on only one memory chip, for example, the sixth memory chip CHIP6, there is no need to perform an additional rebuild on the data 11 stored in the spare memory chip CHIP9 because the data 10 of the sixth memory chip CHIP6 is copied directly to the spare memory chip CHIP9 as the data 11. Thus, the second rebuild of the sixth memory chip CHIP6 may be completed at the same time as the occurrence of a failure in the sixth memory chip CHIP6 because CHIP 9 is a copy of the data in CHIP6.

However, in response to a failure being detected from a memory chip other than the target memory chip (e.g. in this example, a failure other than CHIP6), a second rebuild may be performed on the memory chip where the failure is detected, using all the other normally functioning non-spare memory chips. For example, in a case in which a failure occurs in the fifth memory chip CHIP5, a second rebuild is performed using data and parities stored in the other normal non-spare memory chips, for example, the first through fourth memory chips (CHIP1 through CHIP4) and the sixth through eighth memory chips (CHIP6 through CHIP8), and data of the fifth memory chip CHIP5, restored by the second rebuild, is stored in the spare memory chip CHIP9.

The RAID system 1 is configured to group a plurality of nonvolatile memory chips together and to input data to, or output data from, the plurality of nonvolatile memory chips at the same time in response to the receipt of a data access request. Accordingly, the RAID system 1 may be faster than a system having a single drive, but may have a limited input/output (I/O) bandwidth or throughput for accessing data internally or externally. In the RAID system 1, in addition to the customer applications that are active, there are also read and write operations occurring for rebuilding and storing data of a damaged nonvolatile memory chip, and an operation of comparing the rebuilt data with a parity may be continuously performed internally during a rebuild operation. Thus, a rebuild operation may adversely impact the bandwidth and response speed of the host "HOST" for accessing the memory device 100.

As described above, the RAID system 1 performs a first rebuild based on the failure probability of each of the memory chips of the memory system 100 before the occurrence of a failure in each memory chip. For example, in a case in which the number of memory chips whose failure probability exceeds the predefined threshold value, i.e., the number N of target memory chips, is 1, data stored in the target memory chip may be copied to the spare memory chip CHIP9.

Thereafter, in response to a failure occurring in the target memory chip, a second rebuild may be performed. In this case, the second rebuild may be quickly completed without additional computation because the second rebuild simply restores the data of the target memory chip to the spare memory chip.

Herein below, a rebuild operation will be described in the event in which the number N of target memory chips is greater than 1 (e.g., N>1) will hereinafter be described with reference to FIGS. 5A and 5B.

FIGS. 5A and 5B are diagrams illustrating an exemplary rebuild operation performed by the RAID system according to the exemplary embodiment of FIG. 1.

Referring to FIGS. 5A and 5B, in this example, the fourth and sixth memory chips CHIP4 and CHIP6 are determined to have a failure probability greater than the predefined threshold value of 0.1. For example, according to FIG. 5A, CHIP4 has a failure probability of 0.12, and CHIP6 has a failure probability of 0.11, which both exceed the predefined threshold. Accordingly, in this example, N=2. Thus, a first rebuild needs to be performed on two memory chips, i.e., the fourth and sixth memory chips CHIP4 and CHIP6. In addition, in this particular example, there is only a single memory chip (CHIP 9), In a case in which the number N of target memory chips is greater than 1, for example, N>1, the data of the target memory chips cannot be copied directly to the spare memory chip CHIP9 because there is not enough space to copy two target memory chips. Thus, the RAID controller 200 performs a first rebuild (S140) by creating a parity for data 21 of the fourth memory chip CHIP4 and data 20 of the sixth memory chip CHIP6 and storing the parity in the spare memory chip CHIP9.

The parity may be created by XORing the data 21 and the data 20, but the inventive concept is not limited thereto.

In some exemplary embodiments of the inventive concept, during the first rebuild of the data 21 of the fourth memory chip CHIP4 and the data 20 of the sixth memory chip CHIP6, the entire data 21 and the entire data 20 (FIG. 5A) except for parities may be stored in the spare memory CHIP9.

More specifically, in this example, there may be two read operations, one parity creation operation, and one write operation are used to perform a first rebuild on data of the fourth memory chip CHIP4 and data of the sixth memory chip CHIP6 that form a stripe together and to store the result of the first rebuild in the spare memory chip CHIP9.

For example, the RAID controller 200 may read data chunks D4 and D6, which are stored in the fourth and sixth memory chips CHIP4 and CHIP6 and belong to the same stripe, may create a parity P4,6, and may write the parity P4,6 to the spare memory chip CHIP9.

On the other hand, in the case of performing a first rebuild on a data chunk D18 stored in the fourth memory chip CHIP4 and a parity P15-21 stored in the sixth memory chip CHIP6, the RAID controller 200 may only store the data chunk D18 in the spare memory chip CHIP9 without storing the parity P15-21, instead of two parity creation operations, creating a parity for both the data chunk D18 and the parity P15-21. In this manner, the RAID system 1 can reduce the amount of time that it takes to perform a first rebuild by omitting one parity creation operation.

Even though none of the parities of the target memory chips are stored in the spare memory chip CHIP9 during a first rebuild, the integrity of data restored by a second rebuild upon the occurrence of a failure in any one of the target memory chips may still be ensured.

For example, in a case in which a failure occurs in the fourth memory chip CHIP4, a second rebuild may be completed, without additional computation, using the data chunk D18 already stored in the spare memory chip CHIP9. In a case in which a failure occurs in the sixth memory chip CHIP6, a second rebuild may be performed using data stored in all the other memory chips, e.g., data chunks D15 through D21, and as a result, the parity P15-21 of the sixth memory chip CHIP6 may be restored without additional computations.

On the other hand, in a case in which a failure occurs in a memory chip other than the target memory chips (e.g., memory chips other than the fourth and sixth memory chips CHIP4 and CHIP6), a second rebuild may be performed on an entirety of the memory chips of the memory system 100.

As described above, two target memory chips may be set by performing a first rebuild on two memory chips, e.g., the fourth and sixth memory chips CHIP4 and CHIP6. Accordingly, the probability that any failed memory chip is a target memory chip may be doubled.

FIGS. 6A and 6B are diagrams illustrating another exemplary rebuild operation performed by the RAID system according to the exemplary embodiment of FIG. 1.

In this example, a rebuild operation is performed in a case in which N=3, and such a rebuild may be substantially similar to the rebuild operation described above with reference to FIGS. 5A and 5B.

Referring to FIGS. 6A and 6B, the third, fourth, and sixth memory chips CHIP3, CHIP4, and CI are determined to have a failure probability (e.g. 0.14, 0.12 and 0.11) greater than the predefined threshold value of 0.1. Thus, a first rebuild needs to be performed on three memory chips, for example, the third, fourth, and sixth memory chips CHIP3, CHIP4, and CHIP6.

Since the number of memory chips on which to perform a first rebuild, e.g., the number N of target memory chips, is greater than 1 (for example, N=3), the RAID controller 200 performs a first rebuild by creating a parity using data 32 (shown in FIG. 6A) of the third memory chip CHIP3, data 31 of the fourth memory chip CHIP4, and data 30 of the sixth memory chip CHIP6 and storing the parity in the spare memory chip CHIP9.

During the first rebuild of the data 32 of the third memory chip CHIP3, the data 31 of the fourth memory chip CHIP4, and the data 30 of the sixth memory chip CHIP6, the entire data 32, the entire data 31, and the entire data 30 except for parities may be stored in the spare memory chip CHIP9.

For example, in the case of performing a first rebuild on data chunks D17 and D18 and a parity P15-21 that belong to the same stripe, the RAID system 200 creates a parity P17,18 by performing a parity creation operation on the data chunks D17 and D18 without using the parity P15-21, and stores the parity P17,18 in the spare memory chip CHIP9.

As a result, the amount of time that it takes to perform a first rebuild operation may be reduced by not using the parity P15-21.

Thereafter, if a failure occurs in the third memory chip CHIP3 (see FIG. 6B), a second rebuild is performed using data 34 stored in the spare memory chip CHIP9 through a first rebuild, the data 31 of the fourth memory chip CHIP4, and the data 30 of the sixth memory chip CHIP6 to restore the data 32 of the third memory chip CHIP3.

In some exemplary embodiments, the rebuild operation of FIGS. 6A and 6B may be performed in the same sequence as the rebuild operation of FIGS. 5A and 5B.

More specifically, in a case in which the number N of target memory chips is 2, for example, N=2, a first rebuild is performed on two memory chips. As a result, a parity is created for data stored in each of the two memory chips, and the created parity is stored in the spare memory chip CHIP9.

Thereafter, the RAID controller 200 monitors the failure probability of each of the memory chips included in the memory system 100. In response to a memory chip whose failure probability exceeds the predefined threshold value being additionally detected, the RAID controller 200 may set the additionally-detected memory chip as a new target memory chip and may perform a first rebuild again.

For example, referring to FIG. 5A, a first rebuild is performed by setting the fourth and sixth memory chips CHIP4 and CHIP6 as target memory chips, and as a result, a parity created for the data of the fourth memory chip CHIP4 and the data of the sixth memory chip CHIP6 is stored in the spare memory chip CHIP9. Then, in response to a memory chip whose failure probability exceeds the predefined threshold value of 0.1, for example, the third memory chip CHIP3, being additionally detected, the RAID controller 200 may perform a parity creation operation on the data (for example, a data chunk D3) of the third memory chip CHIP3 and the data (for example, the parity P4,6) stored in the spare memory chip CHIP9. In this manner, a first rebuild can be performed to create a new parity for all the three target memory chips, for example, the third, fourth, and sixth memory chips CHIP3, CHIP4, and CHIP6.

FIGS. 7A and 7B are diagrams illustrating another exemplary rebuild operation performed by the RAID system according to the exemplary embodiment of FIG. 1.

Referring to FIGS. 7A and 7B, the memory system 100 may include a plurality of first through sixteenth memory chips CHIP1 through CHIP16, which store data chunks and parities, and a spare memory chip CHIP17, which stores rebuilt data.

In some exemplary embodiments of the inventive concept, the RAID controller 200 may choose a number of memory chips with a high failure probability as target memories on which to perform a first rebuild.

For example, in the examples of FIGS. 3A and 3B, 5A and 5B, and 6A and 6B, the RAID controller 200 chooses any memory chips whose failure probability exceeds the predefined threshold value as target memory chips on which to perform a first rebuild. On the other hand, in the example of FIGS. 7A and 7B, the RAID controller 200 may choose N memory chips (for example, N=4) with a high failure probability, for example, the third, fourth, sixth, and fifteenth memory chips CHIP3, CHIP4, CHIP6, and CHIP15, as target memory chips on which to perform a first rebuild.

For example, in the example of FIGS. 7A and 7B, the RAID controller 200 performs a first rebuild operation simply by choosing N memory chips with a high failure probability without determining whether the failure probability of each of the first through sixteenth memory chips CHIP1 through CHIP16 exceeds the predefined threshold value. As a result, a parity 44 is created for data 42 stored in the third memory chip CHIP3, data 41 stored in the fourth memory chip CHIP4, data stored in the sixth memory chip CHIP6, and data 43 stored in the fifteenth memory chip CHIP15, and the parity 44 may be stored in the spare memory chip CHIP17.

Thereafter, if a failure occurs in the third memory chip CHIP3, which is one of the target memory chips, a second rebuild operation may be performed using the data 41 of the fourth memory chip CHIP4, the data 40 of the sixth memory chip CHIP15, the data 43 of the fifteenth memory chip CHIP15, and the parity 44 stored by a first rebuild to restore the data 42 of the third memory chip CHIP3.

Figure 8:
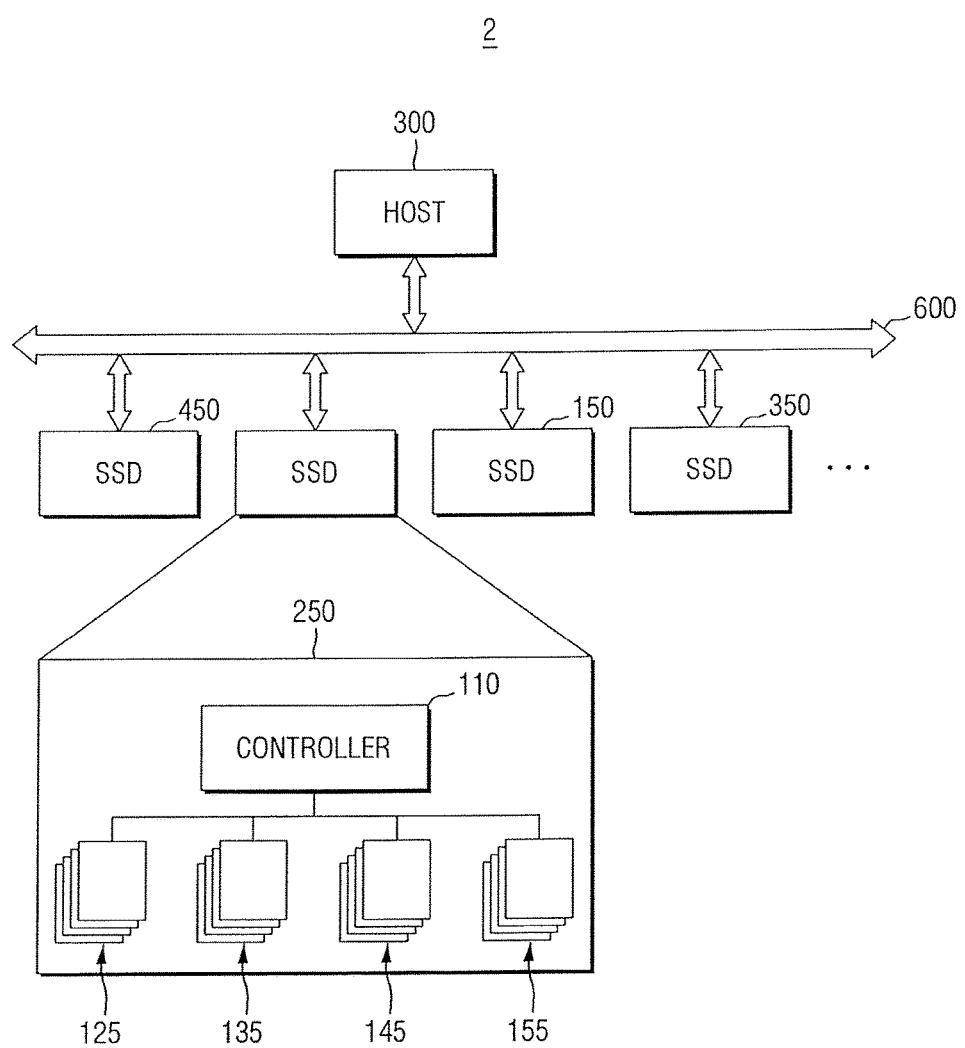
FIG. 8 is a block diagram of a RAID system according to an exemplary embodiment of the inventive concept.

FIG. 8 is a block diagram of a RAID system according to another exemplary embodiment of the inventive concept.

Referring to FIG. 8, a RAID system 2 includes a host 300, SSDs 150, 250, 350, and 450, and a bus 600.

The host 300 of the RAID system 2 may have substantially the same structure as, and operate in substantially the same manner as, the RAID controller 200 of FIG. 1.

The SSD 250 may include a plurality of memory chips 125, 135, 145, and 155 and a memory controller 110.

The memory controller 110 may control the memory chips 125, 135, 145, and 155. In some exemplary embodiments, the memory chips 125, 135, 145, and 155 may have substantially the same structure as, and operate in substantially the same manner as, the nonvolatile memory chips of the memory system 100 of FIG. 1. Thus, a RAID system may be configured by the memory controller 110 using the memory chips 125, 135, 145, and 155.

The memory chips 125, 135, 145, and 155 may include non-spare memory chips, which store data chunks and parities, and a spare memory chip. The memory controller 110 includes circuitry configured to monitor the failure probability of each of the memory chips 125, 135, 145, and 155 and performs a first rebuild on data stored in one or more memory chips whose failure probability satisfies a predefined threshold value to store the corresponding data in the spare memory chip.

A RAID system may also be configured using the SSDs 150, 250, 350, and 450, which are connected to the host 300. For example, the SSDs 150, 250, 350, and 450 include non-spare SSDs, which store data chunks and parities, and a spare SSD. The host 300 may monitor the failure probability of each of the SSDs 150, 250, 350, and 450 and may perform a first rebuild operation according to the failure probability of each of the SSDs 150, 250, 350, and 450, and may perform a second rebuild operation upon the occurrence of a failure in any one of the SSDs 150, 250, 350, and 450 to restore the SSD(s) where the failure has occurred.

The host 300 may monitor the failure probability of each of the SSDs 150, 250, 350, and 450 by monitoring Self-Monitoring, Analysis and Reporting Technology® (SMART) information of each of the SSDs 150, 250, 350, and 450. More specifically, the host 300 may monitor the reallocated sector count and the raw read error rate of each of the SSDs 150, 250, 350, and 450, among other SMART information, may calculate the failure probability of one or more SSDs whose reallocated sector count or raw read error rate exceeds a predefined threshold value, and may determine whether a failure has occurred in the corresponding SSDs.

A computing system according to an exemplary embodiment of the inventive concept will hereinafter be described with reference to FIG. 9.

Figure 9:
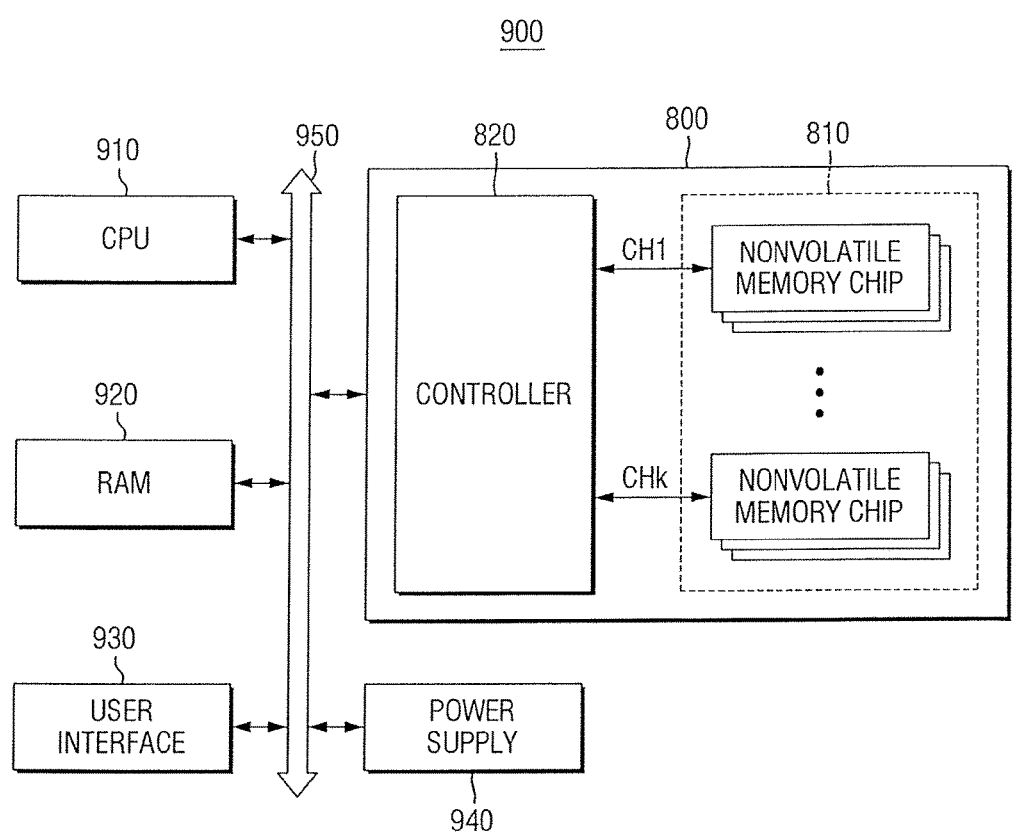
FIG. 9 is a block diagram of a computing system according to an exemplary embodiment of the inventive concept.

FIG. 9 is a block diagram of a computing system according to an exemplary embodiment of the inventive concept.

Referring to FIG. 9, a computing system 900 may include a central processing unit (CPU) 910, a RAM 920, a user interface 930, a power supply 940, and a memory system 800.

The memory system 800 may be a system in which the controller 820 controls the nonvolatile memory device 810. The controller 820 may be, for example, an integrated circuit, a processor, etc., and may be embodied as a separate chip or integrated into another chip. The memory system 800 may be electrically connected to the CPU 910, the RAM 920, the user interface 930, and the power supply 940 via a system bus 950. Data provided via the user interface 930, or processed by the CPU 910, may be stored in the memory system 800.

The nonvolatile memory device 810 is illustrated in FIG. 9 as being connected to the system bus 950 via the controller 820, but the inventive concept is not limited thereto. Alternatively, the nonvolatile memory device 810 may be configured to be connected directly to the system bus 950.

While the inventive concept has been shown and described with reference to exemplary embodiments thereof, it will be apparent to those of ordinary skill in the art that various modifications in form and details may be made thereto without materially departing from the spirit and scope of the inventive concept as defined by the following claims.

What is claimed is:

1. A redundant array of inexpensive disks (RAID) system, comprising:
a nonvolatile memory device configured as a RAID, the nonvolatile memory including a plurality of first memory chips, which store data chunks, and a second memory chip, in which spare memory regions are defined; and
a RAID controller that controls a RAID operation and one or more rebuild operations of the nonvolatile memory device,
wherein the RAID controller monitors a failure probability of each of the first memory chips,
in response to detection of two or more first memory chips having a failure probability that satisfies a predefined threshold value, the RAID controller performs a first rebuild operation on data stored in each of the two or more first memory chips to store the data in the second memory chip, and
in response to detection of a failure occurring in one of the two or more first memory chips, the RAID controller performs a second rebuild operation on data stored in the first memory chip where the failure has occurred using the data stored in the second memory chip.

2. The RAID system of claim 1, wherein the RAID controller performs the first rebuild operation including creation of a parity corresponding to the data stored in each of the two or more first memory chips to store the parity in the second memory chip.

3. The RAID system of claim 2, wherein the creation of the parity comprises XORing the data stored in each of the two or more first memory chips.

4. The RAID system of claim 2, wherein:
the first memory chips store parities corresponding to the data chunks, and
the first rebuild comprises storage of data chunks without parities being stored in each of the two or more memory chips in the second memory chip.

5. The RAID system of claim 1, wherein the RAID controller performs the first rebuild operation prior to an occurrence of a failure in any one of the two or more first memory chips.

6. The RAID system of claim 1, wherein in response to detecting another first memory chip having a failure probability that satisfies the predefined threshold value being additionally-detected after the first rebuild operation, the RAID controller calculates a parity using the data stored in the second memory chip and data stored in the additionally-detected first memory chip, and stores the parity in the second memory chip.

7. The RAID system of claim 1, wherein the second rebuild operation is performed by calculating a parity using the data stored in the second memory chip and the data stored in a first memory chip in which a failure has not occurred among the two or more first memory chips.

8. The RAID system of claim 1, wherein the RAID controller monitors the failure probability of each of the first memory chips using a first information provided by the nonvolatile memory device, and a second information created by the RAID controller regarding the nonvolatile memory device.

9. The RAID system of claim 8, wherein:
the first information comprises at least one of negative-AND (NAND) memory status information and NAND wear-out level information, and
the second information comprises at least one of a program/erase (P/E) cycle information and an uncorrectable error count information.

10. A RAID system, comprising:
a plurality of solid state drives (SSDs) coupled to a host, each of the SSDs including a nonvolatile memory device configured as a RAID, the nonvolatile memory includes a plurality of first memory chips storing data chunks and a second memory chip having spare memory regions; and
a RAID controller that controls a RAID operation and one or more rebuild operations of the nonvolatile memory device,
wherein the RAID controller monitors a failure probability of each of the first memory chips,
in response to two or more first memory chips having a failure probability that satisfies a predefined threshold value being detected, the RAID controller performs a first rebuild operation on data stored in each of the two or more first memory chips to store the data in the second memory chip, and in response to a failure occurring in one of the two or more first memory chips, the RAID controller performs a second rebuild operation on data stored in the first memory chip where the failure has occurred using the data stored in the second memory chip.

11. The RAID system of claim 10, wherein:
the SSDs include first SSDs, which store data chunks and parities corresponding to the data chunks, and a second SSD, which stores data rebuilt from the first SSDs, and
the first SSDs and the second SSD are configured as a RAID.

12. The RAID system of claim 10, wherein the RAID controller performs the first rebuild operation that includes creation of a parity corresponding to the data stored in each of the two or more first memory chips and storage of the parity in the second memory chip.

13. The RAID system of claim 12, wherein the creation of the parity comprises XORing the data stored in each of the two or more first memory chips.

14. The RAID system of claim 12, wherein:
the first memory chips further store parities corresponding to the data chunks, and
the first rebuild operation is performed by storing data chunks, without parities, in each of the two or more memory chips in the second memory chip.

15. The RAID system of claim 10, wherein the RAID controller performs the second rebuild operation by calculation of a parity using the data stored in the second memory chip and the data stored in a first memory chip where the failure has not occurred, from among the two or more first memory chips.

16. A method of operating a redundant array of inexpensive disks (RAID) system, the RAID system including a RAID controller, the method comprising:
providing a nonvolatile memory device configured as a RAID, in which the nonvolatile memory includes a plurality of first memory chips that store data chunks, and a second memory chip in which spare memory regions are defined;
controlling, by the RAID controller, a RAID operation and one or more rebuild operations of the nonvolatile memory device, and monitoring a failure probability of each of the plurality of first memory chips;
performing, by the RAID controller, a first rebuild operation on data stored in each of two or more of the first memory chips to store the data in the second memory chip in response to detecting the failure probability of two or more first memory chips satisfying a predefined threshold value; and
performing, by the RAID controller, a second rebuild operation on data stored in the first memory chip where a failure has occurred using the data stored in the second memory chip in response to detecting the failure occurring in one of the two or more first memory chips.

17. The method of claim 16, wherein the first rebuild operation performed by the RAID includes creating a parity corresponding to the data stored in each of the two or more first memory chips to store the parity in the second memory chip.

18. The method of claim 17, wherein the creating of the parity comprises XORing the data stored in each of the two or more first memory chips.

19. The method of claim 17, further comprising:
storing, by the first memory chips, parities corresponding to the data chunks, and
wherein the first rebuild operation comprises storing data chunks without parities in each of the two or more memory chips in the second memory chip.

20. The method of claim 16, wherein providing the nonvolatile memory device includes providing a plurality of nonvolatile memory devices configured as a RAID, and a providing plurality of solid state drives (SSD), each of which including a respective one of the plurality of nonvolatile memory devices.

21. The method of claim 20, further comprising coupling each of the SSDs to a host.

* * * * *